Oct. 5, 1971   J. V. JOHNSTON   3,610,054
LEVELING DEVICE
Filed July 23, 1969

James V. Johnston,
INVENTOR

Harry H. Saragovitz
Edward J. Kelly
BY  Herbert Berl
Charles R. Carter 3,610,054
LEVELING DEVICE
James V. Johnston, Huntsville, Ala., assignor to the United States of America as represented by the Secretary of the Army
Filed July 23, 1969, Ser. No. 844,125
Int. Cl. G01c *19/20, 19/28*
U.S. Cl. 74—5.6      2 Claims

ABSTRACT OF THE DISCLOSURE

A leveling device for a vehicle for providing the balancing rotation of a housing around an axis without disturbing the settled position of a ballast. The housing enclosing the ballast has an axis, a lower portion provided with ducts connected to a cavity and a pressurized air inlet.

Disposed above the lower portion is a floating ballast having an axis coincident with the housing axis and supported on a thin column of air supplied through the ducts.

A pair of electromagnetic sensors are secured to the housing in cruciform array adjacent the ballast to determine angular deviations between the ballast and housing axes. The sensors control servos disposed on the vehicle and the housing to restore coincidence of the axes responsive to the angular deviations.

BACKGROUND OF THE INVENTION

This invention relates to the field of leveling devices. The use of single axis leveling devices in the leveling operation of inertial platforms requires an alignment for mounting the two units. When compound leveling angles are required of single axis units, the physical mass displacement of either unit is a cosine function of the angle between the two axes. Thus, a small amount of coupling of one unit versus a large coupling in the second unit causes the entire system to become unbalanced and corrective measures are applied in one axis in excess of that needed to balance the system.

Another problem is that platforms controlled by single axis units do not rotate in azimuth while they are in the process of leveling or having already been leveled, will produce a disturbing torque on the ballast.

SUMMARY OF THE INVENTION

The present invention has provided solutions to these problems in that orthogonal alignment of the sensors is contained within one housing, thus decoupling the influence of one axis upon the other axis and eliminating the problem of unbalancing the entire system.

Another feature of this invention is the ability of the housing to rotate about the $x$—$x$ axis without disturbing the settled position of the ballast.

This invention may be better understood from the following detailed description taken in conjunction with the accompanying drawings:

PREFERRED EMBODIMENT OF THE INVENTION

Figure 1:
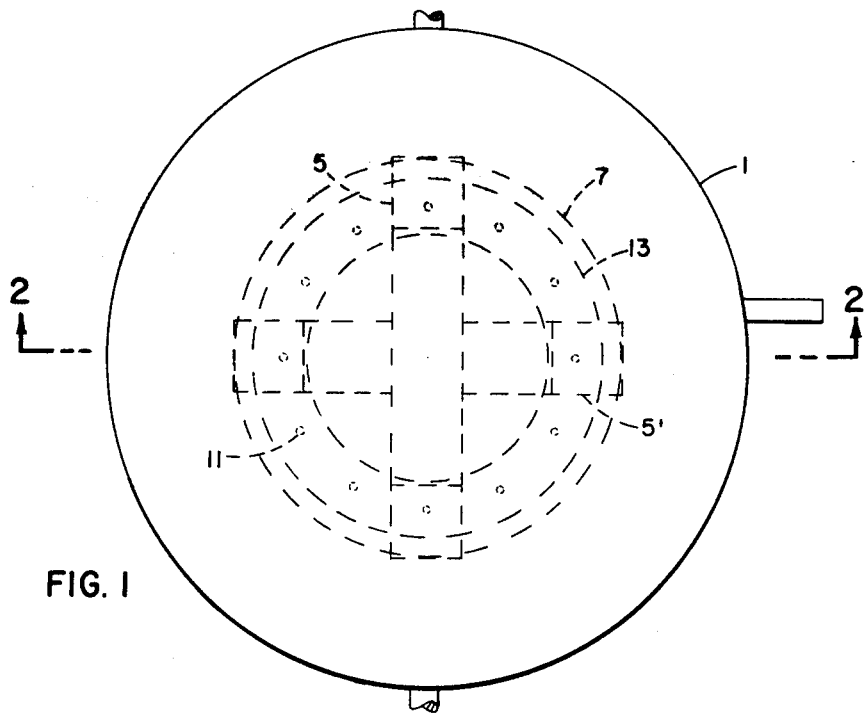
FIG. 1 is a plan view of the device.

Reference numeral 1 indicates a housing that is rotated about an $x$—$x$ axis by servo system 3 or servo system $3^1$ arranged in quadrature relation to the housing. Disposed within the upper section of housing 1 are two standard E electromagnetic sensors 5 and $5^1$ of the differential transformer type and are placed in cruciform array. Although E core type sensors are shown, capactive or optical sensors could be used.

A ballast 7 in the form of segment has one surface with a convex spherical shape and is disposed adjacent the sensors for cooperation therewith. The ballast has an axis $x^1$—$x^1$ that is coincident with housing axis $x$—$x$ in the normal or balanced position. The lower portion of the housing contains a concave spherical surface 9 provided with a plurality of air ducts 11 connected to a cavity 13 and to a pressurized air supply 15. As pressurized air is supplied to the ducts, ballast 7 will be vertical oriented and supported on a thin surface of air indicated by numeral 17.

Figure 2:
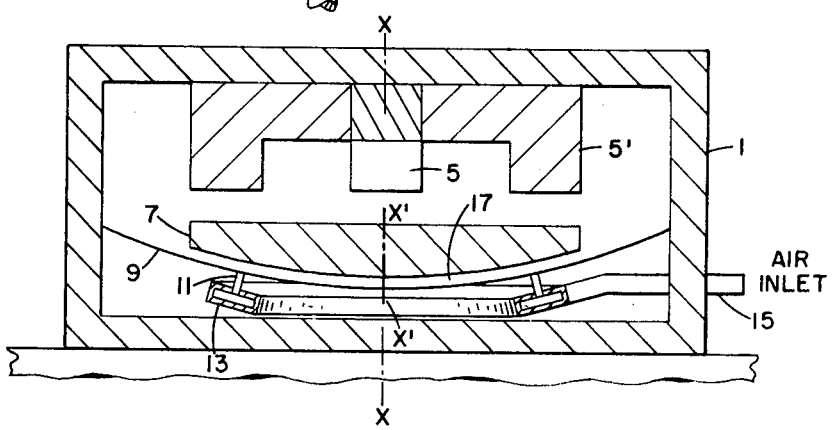
FIG. 2 is a view taken along line 2—2 of FIG. 1.
Figure 3:
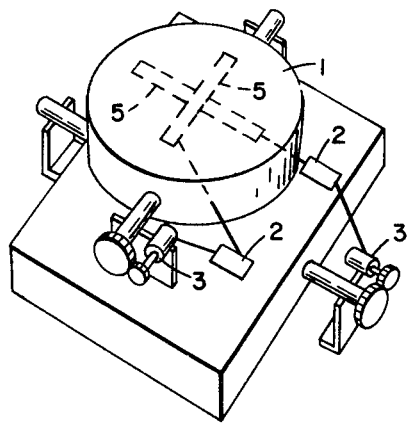
FIG. 3 is a perspective view showing the housing drive connections.

When the housing is caused to move by external forces from the position shown in FIGS. 2 and 3, the housing axis $x$—$x$ and ballast axis $x^1$—$x^1$ will be out of coincidence and angularly deviated from each other. This relative movement between the housing and mass causes an unbalanced position between the ends of sensors 5, $5^1$ and ballast 7 thus generate an electrical signal in the sensors. Considering relative movement between the housing and ballast only in one plane then an electrical signal will be generated either in sensor 5 or $5^1$. The generated signal is fed through amplifiers 2 or $2^1$ to control the operation of either servo system 3 or $3^1$ and rotate the housing to a balanced position wherein the ends of the sensor are equal distance from ballast 7. When relative movement between the housing and the mass is in both planes, then an electrical signal will be generated in both sensors 5 and $5^1$ to control both servo systems 3 and $3^1$.

I claim:

1. A leveling device on a vehicle comprising: a rotatable housing provided with an axis and a concave spherical surface; a non-rotatable ballast having an axis and a corresponding convex spherical surface; said housing having an air supply means and air duct means for separation of said corresponding surfaces for vertical orientation of said ballast axis; sensors secured to said housing in cruciform array adjacent said ballast to determine angular deviations between said ballast and housing axes; and a pair of servos disposed on the vehicle and said housing in quadrature relation; said sensors being connected to said servos for operation to restore coincidence of said axes responsive to the angular deviations.

2. A device as set forth in claim 1 wherein said sensors are electromagnetic sensors.

References Cited

UNITED STATES PATENTS

| | | | |
|---|---|---|---|
| 3,107,540 | 10/1963 | Curriston | 74—5.46 X |
| 3,320,816 | 5/1967 | Johnston | 74—5.6 |
| 3,429,190 | 2/1969 | Dinter | 74—5.6 |
| 3,505,883 | 4/1970 | Moulton | 74—5.6 |
| 3,509,779 | 5/1970 | Chappell | 74—5.6 |

MANUEL A. ANTONAKAS, Primary Examiner

U.S. Cl. X.R.

74—5; 308—9